United States Patent [19]

Tokura et al.

[11] Patent Number: 4,677,378

[45] Date of Patent: Jun. 30, 1987

[54] DISPLACEMENT SENSOR INCLUDING A MAGNETICALLY RESPONSIVE MEMBER AND A PAIR OF PIEZOELECTRIC ELEMENTS

[75] Inventors: Norihito Tokura, Aichi; Hisasi Kawai, Toyohashi, both of Japan

[73] Assignee: Nippon Soken, Inc., Nishio, Japan

[21] Appl. No.: 826,014

[22] Filed: Feb. 4, 1986

[30] Foreign Application Priority Data

Feb. 5, 1985 [JP] Japan ................................. 60-21335

[51] Int. Cl.$^4$ ......................... G01B 7/30; G01P 3/48; H01L 41/08; F02P 17/00
[52] U.S. Cl. .................................. 324/208; 123/616; 123/617; 310/328; 310/346; 324/166
[58] Field of Search ............... 324/173, 174, 207, 208, 324/166; 310/328, 346; 73/517 R, 517 AV, 658, DIG. 4; 123/350, 351, 414, 418, 616, 617

[56] References Cited

U.S. PATENT DOCUMENTS

| | | | |
|---|---|---|---|
| 3,846,697 | 11/1974 | Cila et al. | 324/208 X |
| 3,855,525 | 12/1974 | Bernin | 324/208 |
| 4,086,533 | 4/1978 | Ricouard et al. | 324/208 |
| 4,409,548 | 10/1983 | Focht | 324/208 X |
| 4,524,932 | 6/1985 | Bodziak | 324/207 X |

FOREIGN PATENT DOCUMENTS 58-42412 9/1983 Japan .

Primary Examiner—Gerard R. Strecker
Attorney, Agent, or Firm—Cushman, Darby & Cushman

[57] ABSTRACT

A displacement sensor is provided with first and second piezoelectric elements, a pair of electrodes at one and the other ends of each of the first and the second piezoelectric elements; a permanent magnet mechanically fixed to one end of the first piezoelectric element; a small piece mechanically fixed to one end of the second piezoelectric element and having almost the same weight as that of the permanent magnet; and a base plate to which the other ends of the first and the second piezoelectric elements are mechanically fixed; wherein the electrodes provided at the other end of each of the first and the second piezoelectric elements are electrically connected, and the electrodes provided at one end of each of the first and the second piezoelectric elements are used as output terminals.

Also, a pair of small pieces made of a magnetic material and a non-magnetic material can be used instead of the above permanent magnet and small piece.

4 Claims, 7 Drawing Figures

DISPLACEMENT SENSOR INCLUDING A MAGNETICALLY RESPONSIVE MEMBER AND A PAIR OF PIEZOELECTRIC ELEMENTS

BACKGROUND OF THE INVENTION (1) Field of the Invention

The present invention relates to a displacement sensor which detects displacement such as the rotation of an internal-combustion engine.

(2) Description of the Related Art

Several kinds of sensors have been proposed in the prior art, such as an electro-magnetic pickup construction having an pickup coil, a magnetic resistance element construction, a Hall element construction, as shown in Japanese Examined Patent Publication (Kokoku) No. 58-42412, or a photo-interrupter construction, and so on, as displacement sensors, particularly rotation sensors for detecting rotation.

In the prior art sensors having an electromagnetic pickup construction, a problem arises wherein the output voltage changes in accordance with the rotation speed, the construction is complicated, and the cost is high because of the necessity of winding the pickup coil.

In the prior art sensors having a magnetic resistance element, Hall element, or photo-interrupter construction, a problem arises in that it is necessary to provide a drive power source.

SUMMARY OF THE INVENTION

In view of the above-mentioned problems in the prior art, it is the object of the present invention to realize a displacement sensor in which the output voltage does not change, irrespective of any change in the rotation speed etc., the construction is simple, and it is not necessary to provide a drive power source.

In order to attain the above-mentioned object, according to one aspect of the present invention, there is provided a displacement sensor comprising first and second piezoelectric elements, a pair of electrodes being provided at one and the other ends of each of the first and second piezoelectric elements; a permanent magnet mechanically fixed to one end of the first piezoelectric element; a small piece mechanically fixed to one end of the second piezoelectric element and having almost the same weight as that of the permanent magnet; and a base plate to which the other ends of the first and the second piezoelectric elements are mechanically fixed; wherein the electrodes provided at the other end of each of the first and the second piezoelectric elements are electrically connected, and the electrodes provided at one end of each of the first and the second piezoelectric elements are used as output terminals.

Also, according to another aspect of the present invention there is provided a displacement sensor comprising first and second piezoelectric elements, a pair of electrodes being provided at one and the other ends of each of the first and the second piezoelectric elements; a small piece made of magnetic material mechanically fixed to one end of the first piezoelectric element; a small piece made of non-magnetic material mechanically fixed to one end of the second piezoelectric element and having almost the same weight as that of the small piece made of magnetic material; and a base plate to which the other ends of the first and the second piezoelectric elements are mechanically fixed; wherein the electrodes provided at the other end of each of the first and the second piezoelectric elements are electrically connected, and the electrodes provided at one end of each of the first and the second piezoelectric elements are used as output terminals.

Thus, according to one aspect of the present invention, the permanent magnet is periodically attracted or repulsed in accordance with the displacement of the magnetic material or another permanent magnet by, for example, the rotation of the rotary disk, and as a result, the first piezoelectric element generates the predetermined electro-motive force by expanding or contracting. Contrary to this, when the sensor receives an external force and vibrates as a whole, both the small piece and the permanent magnet vibrate in the same mode, both the first and the second piezoelectric elements generate an equal electro-motive force, and these equal electro-motive forces are cancelled by the difference in polarity of these electro-motive forces.

Also, according to another aspect of the present invention, the small piece made of magnetic material is periodically attracted in accordance with the displacement of the permanent magnet by, for example, the rotation of the rotary disk, and as a result, the first piezoelectric element generates a predetermined electro-motive force by expanding. Contrary to this, when the sensor receives the external force and vibrates as a whole, both small pieces made of magnetic material and non-magnetic material vibrate in the same mode, and both the first and the second piezoelectric elements generate an equal electro-motive force, and these equal electro-motive forces are cancelled by the difference in polarity of these electro-motive forces.

DESCRIPTION OF THE PREFERRED EMBODIMENTS

Figure 1:
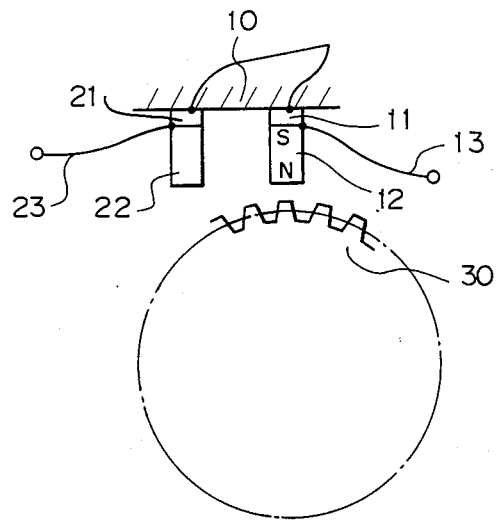
FIG. 1 is a model diagram explaining the principle of the operation of the displacement sensor according to the present invention.

FIG. 1 is a model diagram explaining the principle of the operation of the displacement sensor according to the present invention. Reference numeral 10 is a base plate on which the first and the second piezoelectric elements 11 and 21 having the same characteristics are arranged and adhesively fixed thereto in parallel. A permanent magnet 12 is adhesively fixed at one end of the first piezoelectric element 11, and a non-magnetized iron piece 22 having the same shape and weight as those of the permanent magnet 12 is adhesively fixed at one end of the second piezoelectric element 21. A pair of electrodes is provided at one and the other ends of each of the first and the second piezoelectric elements 11 and 21, and are arranged to have the same positional relationship, namely, if it is assumed that the electrode provided at the end generating a positive voltage when the above element contracts is called the "positive electrode" and the electrode provided at the end generating a negative voltage when the above element contracts is called a "negative electrode", then the positive electrode and the negative electrode of the first piezoelectric element 11 are at the side of the base plate 10 and at the side of the permanent magnet 12, respectively, and the positive electrode and the negative electrode of the second piezoelectric element 21 are at the side of the base plate 10 and at the side of the iron piece 22, respectively. The positive electrodes of the first piezoelectric element 11 and the second piezoelectric element 21 are connected by a lead wire or the conductive film formed on the base plate 10, or the like. Reference numeral 30 is a rotary disk made of magnetic material and having a number of projections and recesses formed around the circumference of the rotary disk 30 at equal intervals.

Figure 2:
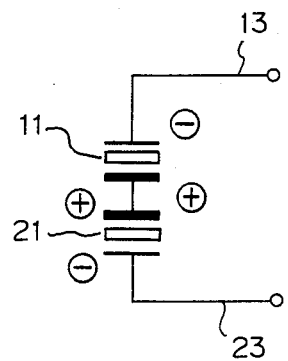
FIG. 2 is a circuit diagram including the piezoelectric elements in the sensor shown in FIG. 1.

FIG. 2 shows a circuit diagram including the first and the second piezoelectric elements 11 and 21. Lead wires 13 and 23 are connected to the negative electrodes of the first and the second piezoelectric elements 11 and 21, respectively, and are used as output terminals.

When one of the projections formed around the rotary disk 30 approaches the permanent magnet 12, the permanent magnet 12 is attracted toward the rotary disk 30 and the first piezoelectric element 11 expands. Then, each of a positive voltage and a negative voltage are generated at the negative electrode side and the positive electrode side of the first piezoelectric element 11, respectively. However, the shape of the iron piece 22 does not change, and therefore, no voltage is generated at the second piezoelectric element 21. As a result, the voltage at the terminal 13 becomes higher than the voltage at the terminal 23.

Next, when the rotary disk 30 further rotates and one of the recesses formed around the plate 30 approaches the permanent magnet 12, the above attracting force between the permanent magnet 12 and the rotary disk 30 is decreased and the expansion of the first piezoelectric element 11 is also decreased, and as a result, the absolute value of the voltage generated at each electrode side of the first piezoelectric element 11 becomes small. Thus, a voltage having a waveform corresponding to the arrangement of the projections and recesses provided around the circumference of the rotary disk 30 is generated between the lead wires 13 and 23.

When the structure of the sensor vibrates as a whole, both the permanent magnet 12 and the iron piece 22 having the same weight as that of the magnet 12 vibrate in the same mode. For example, when both the first and the second piezoelectric elements 11 and 21 receive an expansion force, an equal positive voltage is generated at both negative electrodes of the first and the second piezoelectric elements 11 and 21. As a result, the voltage generated at the first piezoelectric element 11 is cancelled by the voltage generated at the second piezoelectric element 21, and therefore, no voltage difference is generated between the lead wires 13 and 23.

Thus, by constructing the displacement sensor as above-mentioned, it is not necessary to provide a drive power source, it is possible to obtain a superior effect by constructing the sensor in a small size and light weight, to always obtain a constant output voltage irrespective of the rotation speed of the rotary disk 30, and to detect displacement even if the rotation speed of the disk 30 is very slow.

Figure 3:
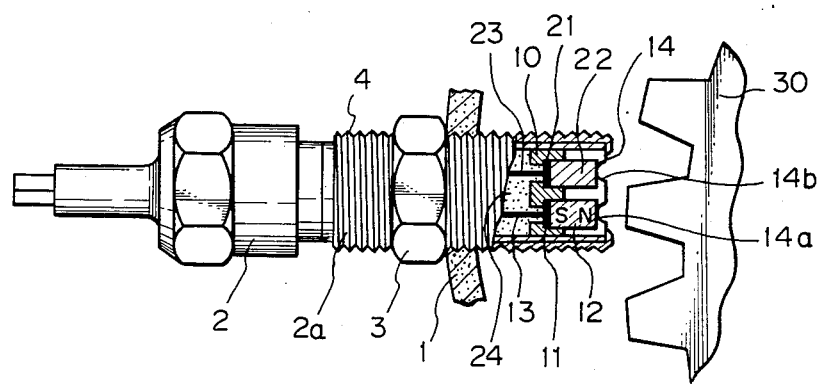
FIG. 3 is a partial sectional front view showing the first embodiment of the sensor according to the present invention.

FIG. 3 shows the concrete construction according to the first embodiment of the present invention. The rotary disk 30 has a number of projections made of a magnetic material and set at equal intervals around the circumference of the disk 30. Reference numeral 2 denotes a rotation sensor, the housing 2a of which is fitted through a stay 1 at a screw portion 4 provided around the surface of the housing 2a and is fixed to the stay 1 by a nut 3. Reference numerals 11 and 21 correspond to the first and the second piezoelectric elements. The negative electrode of the first piezoelectric element 11 is connected to the lead wire 13, and the permanent magnet 12 is adhesively fixed to that negative electrode side. The negative electrode of the second piezoelectric element 21 is connected to the lead wire 23, and the iron piece 22 is adhesively fixed to that negative electrode side. The positive electrodes of the first piezoelectric element 11 and the second piezoelectric element 21 are connected in common by a lead wire not shown in the drawings. The positive electrodes of the first and the second piezoelectric elements 11 and 21 are adhesively fixed on a recess of the base plate 10. The other ends of the permanent magnet 12 and the iron piece 22 face toward the opening provided at the end of the housing 2a, and these other ends of the permanent magnet 12 and the iron piece 22 are fixed by a spring disk 14 having elastic spherical projections 14a and 14b. The circumference of the spring disk 14 is fixed at an opening provided at the end of the housing 2a of the rotation sensor 2 by caulking, and the spherical projections 14a and 14b exert a constant pressure on the permanent magnet 12 and iron piece 22, respectively. The inner portion 24 provided at the inner side from the base plate 10 in the rotation sensor 2 is filled with the resin. The base plate 10 is adhesively fixed in the housing 2a of the rotation sensor 2 and has through holes through which the lead wires 13 and 23 are passed, and recesses which hold the first piezoelectric element 11 and the permanent magnet 12, and the second piezoelectric element 21 and the iron piece 22, respectively.

When the projections of the rotary disk 30 are distant from the permanent magnet 12, the first and the second piezoelectric elements 11 and 21 are subjected to a constant pressure by the projections 14a and 14b of the spring disk 14, through the permanent magnet 12 and the iron piece 22, and as a result, a predetermined offset voltage is generated between the lead wires 13 and 23. (Refer to the waveform "b" shown in FIG. 4)

Figure 4:
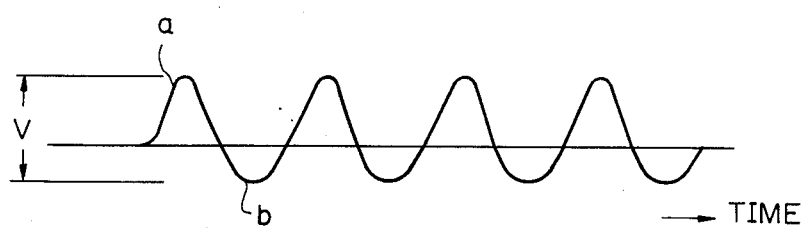
FIG. 4 is a diagram showing the output waveform in the first embodiment of the present invention.

Next, when the rotary disk further rotates and one of the projections formed around the rotary disk 30 approaches the permanent magnet 12, the permanent magnet 12 is attracted to that projection made of a magnetic material, the first piezoelectric element 11 expands, and the waveform of the voltage generated between the lead wires 13 and 23 becomes that of the waveform "a" shown in FIG. 4. The iron piece 22 is not influenced even if the projection of the rotary disk 30 approaches the permanent magnet 12, and therefore, the output voltage generated at the second piezoelectric element 21 does not change.

However, when the rotation sensor 2 is vibrated by an external force, both the permanent magnet 12 and the iron piece 22 vibrate in the same mode, as both the permanent magnet 12 and the iron piece 22 are equal in weight. Therefore, as for FIG. 2, the output voltage generated by the first piezoelectric element 11 is cancelled by the output voltage generated by the second piezoelectric element 21.

Although in the above-mentioned embodiment, both the permanent magnet 12 and the iron piece 22 are subjected to pressure by the spring disk 14, it is not always necessary to provide the spring disk 14. However, provision of the spring disk 14 ensures a stronger resistance to vibration.

Figure 5:
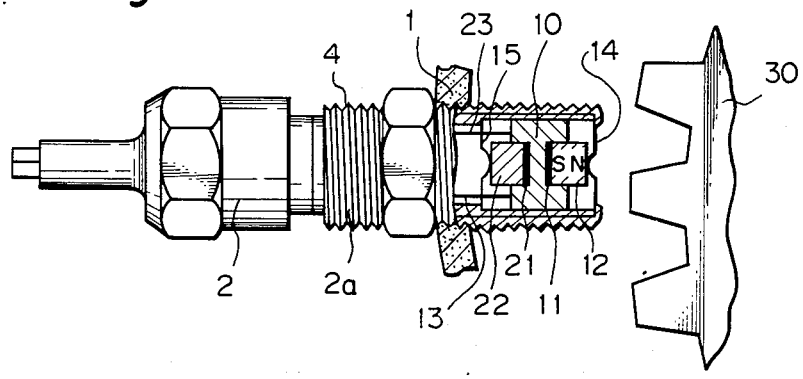
FIG. 5 is a partial sectional front view showing the second embodiment of the sensor according to the present invention.

Also, although in the above-mentioned first embodiment, the first and the second piezoelectric elements 11 and 21 are arranged in parallel, it is possible to arrange these piezoelectric elements 11 and 21 in series, according to the second embodiment as shown in FIG. 5. In FIG. 5, the base plate 10 is adhesively fixed in the housing 2a of the sensor 2. The negative electrode of the second piezoelectric element 21 is adhesively fixed to the left side recess of the base plate 10, and the positive electrode of the first piezoelectric element 11 is adhesively fixed to the right side recess of the base plate 10. One end of the iron piece 22 is adhesively fixed to the positive electrode of the second piezoelectric element 21, and the other end of the iron piece 22 is subjected to pressure by the spring disk 15, i.e., receives an offset force from the spring disk 15. The regulation of the offset force is carried out when the base plate 10 is adhesively fixed to the housing 2a. A part of the circumference of the spring disk 15 is fixed at the recess of the housing 2a. One end of the permanent magnet 12 is adhesively fixed to the negative electrode of the first piezoelectric element 11, and the other end of the permanent magnet 12 faces the opening provided at the end of the housing 2a and is subjected to the offset force from the spring disk 14. The value of the offset force received from the spring disk 14 is the same as the value of the offset force received from the spring disk 15. A part of the circumference of the spring disk 14 is fixed to the opening provided at the end of the housing 2a by caulking. The lead wire 13 is connected to the negative electrode of the first piezoelectric element 11 through the through hole provided at the spring disk 15 and both the slot and the hole provided at the base plate 10. The lead wire 23 is connected to the positive electrode of the second piezoelectric element 21 through the through hole provided at the spring disk 15 and the slot provided at the base plate 10. The negative electrode of the second piezoelectric element 21 and the positive electrode of the first piezoelectric element 11 are connected in common by a lead wire not shown in the drawings.

Figure 6:
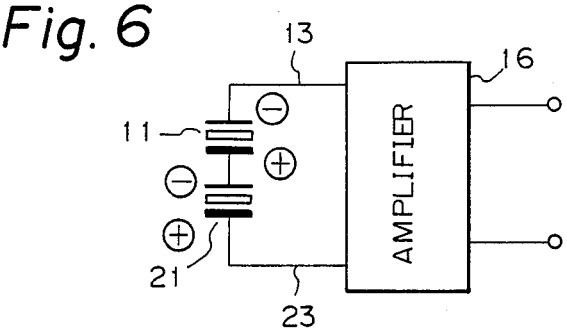
FIG. 6 is a circuit diagram including the piezoelectric elements and an amplifier in the sensor shown in FIG. 5.

FIG. 6 shows the circuit diagram according to the second embodiment shown in the above FIG. 5. In this case, it is possible to increase the rotation speed to be measured to a higher value according to a decrease in the weight of the permanent magnet 12 and the iron piece 22, and therefore, the magnet 12 is desirably made of a rare-earth metal.

In FIG. 6, reference numeral 16 is an amplifier having a high input impedance and constructed by a metal oxide silicon field effect transistor (MOSFET), with the lead wires 13 and 23 led out from the rotation sensor 2 and connected to the input terminals of the amplifier 16, and thereby, the output voltage generated from the first and the second piezoelectric elements is amplified. In this connection, as the above amplifier 16 has a high input impedance, the electric charges accumulated in the first and the second piezoelectric elements 11 and 21 do not discharge through the amplifier 16.

When the projections of the rotary disk 30 are distant from the permanent magnet 12, the first and the second piezoelectric elements 11 and 21 are subjected to a constant offset force from the spring disks 14 and 15 through the permanent magnet 12 and the iron piece 22. Therefore, a negative voltage corresponding to the offset force is generated between the output terminals connected to the lead wires 13 and 23.

When one of the projections of the rotary disk 30 approaches the permanent magnet 12, the permanent magnet 12 is attracted to the right side in FIG. 5. Contrary to this, the iron piece 22 is not influenced, and as a result, a predetermined positive voltage is generated between the output terminals connected to the lead wires 13 and 23.

Also, when the sensor 2 vibrates as a whole, and if it is assumed that the sensor 2 is receiving an accelerating force toward the right side in FIG. 5, for example, the first piezoelectric element 11 expands and a negative voltage is generated at the positive electrode side, and the second piezoelectric element 21 contracts and a negative voltage is generated at the negative electrode side. As a result, these generated voltages cancel each other, and therefore, the voltage generated between the output terminals does not change.

Also, in each of the above-mentioned embodiments, if the projections of the rotary disk 30 are alternately magnetized as N pole and S pole, the attractive force and the repulsive force alternately operates between the permanent magnet 12 and the projection of the rotary disk 30, and as a result, it is possible to increase the output voltage of the rotation sensor 2. In this connection, it is also possible to magnetize all projections of the rotary disk 30 as only one pole, namely, as either a S pole or a N pole.

Figure 7:
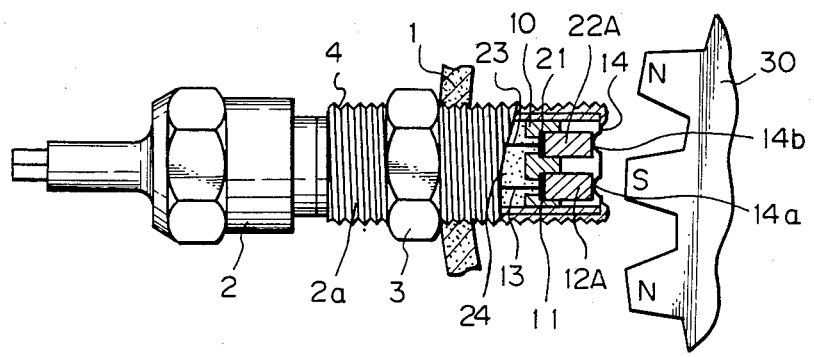
FIG. 7 is a partial sectional front view showing the third embodiment of the sensor according to the present invention.

FIG. 7 shows the third embodiment according to the present invention. In this embodiment, a non-magnetized piece made of a magnetic material 12A is used instead of the permanent magnet 12, and a small piece made of a non-magnetic material 22A is used instead of the iron piece 22, and further, the projections of the rotary disk 30 are alternately magnetized as a N pole and a S pole.

In this embodiment, when the piece made of a magnetic material 12A is attracted periodically by the magnetic force generated from the magnetized projections of the rotary disk 30, the first piezoelectric element 11 generates a predetermined voltage. Contrary to this, when the sensor 2 vibrates as a whole and both the piece made of a magnetic material 12A and the small piece made of a non-magnetic material 22A vibrate, both the first and second piezoelectric elements 11 and 21 generate an equal voltage, and as a result, these generated voltages cancel each other out.

Although in each of the above-mentioned embodiments, the sensor 2 is used for detecting the rotation of the rotary disk 30, it is also possible to detect a periodical displacement such as a reciprocal motion or swing motion, according to the present invention.

As described above, according to the present invention, the permanent magnet or the piece made of a magnetic material is attracted or repulsed in accordance with a displacement, such as the rotation of the rotary disk, and as a result, the first piezoelectric element generates an electromotive force by being subjected to stress. Therefore, according to the present invention, it is not necessary to provide a drive power source and it is possible to attain a superior effect in that the sensor can be constructed in a small size and light weight, and a constant output voltage can be always obtained irrespective of the displacement speed of the detected body, such as the rotation speed of the rotary disk.

Further, according to the present invention, when the sensor is vibrated by an external force, both the small piece and the permanent magnet or the piece made of a magnetic material vibrate in the same mode, and both the first and the second piezoelectric element generate an equal electromotive force. As a result, these electromotive forces are cancelled by the difference in polarity of these electromotive forces, and therefore, it is also possible to attain a superior effect whereby erroneous operation due to the vibration is prevented.

We claim:

1. A displacement sensor for sensing displacement of a magnetic material comprising:
    a first piezoelectric element and a second piezoelectric element, each said piezoelectric element having two ends; a pair of electrodes being provided, one each, respectively, at one end and at the other end of each of said first and second piezoelectric elements;
    a permanent magnet mechanically fixed at a base end thereof to one end of said first piezoelectric element so as to be attracted or repulsed as magnetic material is temporarily brought into proximity therewith, thereby consequentially temporarily physically distorting said first piezoelectric element;
    a weight piece mechanically fixed at a base end thereof to one end of said second piezoelectric element and having approximately the same weight as said permanent magnet but a substantially lesser propensity to be attracted or repulsed as magnet material is temporarily brought into proximity therewith, whereby said first and second piezoelectric elements will tend to be similarly distorted when exposed in common to vibrational effects, but will tend to be differentially distorted when exposed to the proximity of magnetic material; and
    a base plate having said other ends of said first and second piezoelectric elements mechanically fixed thereto;
    said electrodes provided at the other end of each of said first and second piezoelectric elements being electrically connected to one another, and said electrodes provided at one end of each of said first and second piezoelectric elements being adapted to be used as output terminals for a monitor of the difference in electrical potential between said one ends of said first and second piezoelectric elements.

2. A displacement sensor according to claim 1, further comprising;
    each of said permanent magnet and said weight piece having a free end opposite to said base end thereof;
    a spring disk pressing said free ends of said permanent magnet and said weight piece in a corresponding direction relative to said base plate, so that said permanent magnet and said weight piece always receive a predetermined equal offset force.

3. A displacement sensor for sensing displacement of a permanenet magnet comprising:
    a first piezoelectric element and a second piezoelectric element, each said peizoelectric element having two ends; a pair of electrodes being provided, one each, respectively, at one end and at the other end of each of said first and second piezoelectric elements;
    a piece of magnetic material mechanically fixed at a base end thereof to one end of said first piezoelectric element so as to be attracted as a permanent magnet is temporarily brought into proximity therewith, thereby consequentially temporarily physically distorting said first piezoelectric element;
    a weight piece made of a non-magnetic material and mechanically fixed at a base end thereof to one end of said second piezoelectric element and having approximately the same weight as said piece of magnetic material whereby said first and second piezoelectric elements will tend to be similarly distorted when exposed in common to vibrational effects, but will tend to be differentially distorted when exposed to the proximity of a permanent magnet; and
    a base plate having said other ends of said first and second piezoelectric elements mechanically fixed thereto;
    said electrodes provided at the other end of each of said first and second piezoelectric elements being electrically connected to one another, and said electrodes provided at one end of each of said first and second piezoelectric elements being adapted to be used as output terminals for a monitor of the difference in electrical potential between said one ends of said first and second piezoelectric elements.

4. A displacement sensor according to claim 3, further comprising:
    each of said piece of magnetic material and said weight piece having a free end opposite to said base end thereof;
    a spring disk pressing said free ends of said piece of magnetic material and said weight piece of non-magnetic material in a corresponding direction relative to said base plate, so that said piece of magnetic material and said weight piece of non-magnetic material always receive a predetermined equal offset force.

* * * * *